US006951540B2

(12) United States Patent
Ebbini et al.

(10) Patent No.: US 6,951,540 B2
(45) Date of Patent: *Oct. 4, 2005

(54) ULTRASOUND IMAGING SYSTEM AND METHOD USING NON-LINEAR POST-BEAMFORMING FILTER

(75) Inventors: Emad S. Ebbini, Edina, MN (US); Pornchai Phukpattaranont, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 149 days.

This patent is subject to a terminal disclaimer.

(21) Appl. No.: 10/435,102

(22) Filed: May 9, 2003

(65) Prior Publication Data

US 2004/0030251 A1 Feb. 12, 2004

Related U.S. Application Data

(63) Continuation-in-part of application No. 10/143,206, filed on May 10, 2002, now Pat. No. 6,705,993.

(51) Int. Cl.[7] ............................................... A61B 8/00
(52) U.S. Cl. ...................................................... 600/437
(58) Field of Search ........................ 600/300, 407–472; 382/100, 128, 260; 342/159, 162, 165, 171; 381/150; 348/383, 497; 73/625, 626; 367/7, 11, 130, 138

(56) References Cited

U.S. PATENT DOCUMENTS

| | | |
|---|---|---|
| 5,369,624 A | 11/1994 | Fukukita et al. |
| 5,396,285 A | 3/1995 | Hedberg et al. |
| 5,685,308 A | 11/1997 | Wright et al. |
| 5,790,692 A | 8/1998 | Price et al. |
| 5,810,731 A | 9/1998 | Sarvzyan et al. |
| 5,833,615 A | 11/1998 | Wu et al. |
| 5,902,243 A | 5/1999 | Holley et al. |
| 5,961,463 A | 10/1999 | Rhyne et al. |
| 5,980,459 A | 11/1999 | Chiao et al. |
| 6,102,858 A | 8/2000 | Hatfield et al. |
| 6,108,572 A | 8/2000 | Panda et al. |
| 6,132,377 A | 10/2000 | Bolorforosh et al. |
| 6,142,942 A | 11/2000 | Clark |
| 6,213,951 B1 | 4/2001 | Krishnan et al. |
| 6,231,512 B1 | 5/2001 | Chiao et al. |
| 6,290,647 B1 | 9/2001 | Krishnan |
| 6,322,512 B1 | 11/2001 | De John et al. |
| 6,340,346 B1 | 1/2002 | Almog et al. |
| 6,342,810 B1 | 1/2002 | Wright et al. |
| 6,352,511 B1 | 3/2002 | Hossack et al. |
| 6,424,730 B1 | 7/2002 | Wang et al. |
| 6,705,993 B2 * | 3/2004 | Ebbini et al. ................ 600/443 |

OTHER PUBLICATIONS

Simmons et al., "Modeling of the Non–linear Acoustic Response of Bubbles by Volterra Series Analysis," 2000 IEEE Acoustic Speech and Signal Processing International Conference Proceedings, Jun. 5–9, 2000;I:189–192.

Averkiou, "Tissue Harmonic Imaging" *2000 IEEE Ultrasonics Symposium Proceedings*, Oct. 22–25, 2000;2:1563–1572.

(Continued)

*Primary Examiner*—Ali Imam
(74) *Attorney, Agent, or Firm*—Mueting, Raasch & Gebhardt, P.A.

(57) ABSTRACT

Systems and/or methods provide for ultrasound imaging through the use of a dynamic non-linear post-beamforming filter (e.g., based on a pth-order Volterra model) capable of separating the linear and non-linear components of image data. A coefficient identification algorithm for deriving coefficients for filter is also provided.

67 Claims, 6 Drawing Sheets

OTHER PUBLICATIONS

Ebbini, "Dual–Mode Ultrasound Phased Arrays for Noninvasive Surgery," Powerpoint Presentation, Acoustical Society of America Meeting, Fort Lauderdale, FL, 2001:38 pgs.

Ebbini, "Ultrasonic and Electromagnetic Techniques for Assessment of Temperature and Tissue Damage," Powerpoint Presentation, Energy–Based Therapy Meeting, Johnson & Johnson, Princeton, NJ, 2001, 80 pgs.

Frinking et al., "Ultrasound Contrast Imaging: Current and New Potential Methods," *Ultrasound in Med. & Biol.*, 2000;26(6):965–975.

Haider et al., "Higher Order Nonlinear Ultrasonic Imaging," *IEEE Ultrasonics Symposium Proceedings*, Oct. 17–20, 1999;2:1527–1531.

Harada et al., "A pipeline architecture of quadratic adaptive Volterra filters based on NLMS algorithm," *2001 IEEE Int. Symp. on Circuits and Systems*, May 6–9, 2001;2:785–788.

Phillips, "Contrast Pulse Sequences (CPS): Imaging Nonlinear Microbubbles," *2001 IEEE Ultrasonics Symposium Proceedings*, Oct. 7–10, 2001;2:1739–1745.

Pratt, *Digital Image Processing*, $2^{nd}$ Edition, Wiley–Interscience, John Wiley & Sons, 1991:578–595.

Shcherbakov, "A parallel architecture for adaptive frequency–domain Volterra filtering," *1996 IEEE Digital Signal Processing Workshop Proceedings*, Sep. 1–4, 1996;203–206.

Simpson et al., "Pulse Inversion Doppler: A New Method for Detecting Nonlinear Echoes from Microbubble Contrast Agents." *IEEE Transactions On Ultrasonics, Ferroelectrics, and Frequency Control*, Mar. 1999; 46(2):372–382.

Thomenius, "Evolution of Ultrasound Beamformers," *1996 IEEE Ultrasonics Symposium Proceedings*, Nov. 3–6, 1996;2:1615–1622.

Yao et al., "Post–Beamforming Second–Order Volterra Filter for Nonlinear Pulse–Echo Imaging," *IEEE ICASSP*, May 13, 2002;4 pgs.

* cited by examiner

ULTRASOUND IMAGING SYSTEM AND METHOD USING NON-LINEAR POST-BEAMFORMING FILTER

CROSS REFERENCE TO RELATED APPLICATIONS

This is a Continuation-in-Part of U.S. patent application Ser. No. 10/143,206 filed on 10 May 2002. now U.S. Pat. No. 6.705.993. entitled "ULTRASOUND IMAGING SYSTEM AND METHOD USING NON-LINEAR POST-BEAMFORMING FILTER", which is hereby incorporated by reference.

STATEMENT OF GOVERNMENT RIGHTS

The present invention was made with support from the National Institute of Health (NIH) under Grant No, CA 66602 and Department of Defense (DoD)—Army Grant No. DAMD17-01-1-0330. The government may have certain rights in this invention.

FIELD OF THE INVENTION

The present invention relates generally to imaging. More particularly, the present invention pertains to the use of a non-linear post-beamforming filter in ultrasound imaging.

BACKGROUND OF THE INVENTION

Many conventional ultrasound scanners create two-dimensional images of tissue located in a region of interest in which brightness of a pixel in the image is based on intensity of echo return following the provision of wave energy directed towards the region of interest. Such images may be formed from a combination of fundamental and harmonic signal components, the former being direct echoes of the transmitted pulse, and the latter being generated in a non-linear medium, such as tissue, from finite amplitude ultrasound propagation. As is known, many times, ultrasound images can be improved by suppressing the fundamental and emphasizing the harmonic signal components.

Propagation of ultrasound wave energy in biological tissues is known to be non-linear, giving rise to generation of harmonics. In harmonic imaging, energy is transmitted at a fundamental frequency, $f_0$, and, for example, an image may be formed using energy at the second harmonic, $2f_0$.

Further, generally, in many instances, ultrasound contrast agents have been used for ultrasound imaging, e.g., imaged by using standard echo imaging or second harmonic imaging. Harmonic imaging is usually preferred over standard echo imaging when contrast agents are present because, for example, the harmonic signal components returned from contrast agents is generally much larger than that from surrounding tissue. Furthermore, for example, harmonic imaging provides a more desirable contrast between blood and tissue, and is able to reduce artifacts due to phase aberrations in the body. However, since harmonic imaging still receives signal from tissue, the specificity between contrast agent and tissue is still limited.

The diagnostic applications of ultrasound imaging have expanded enormously in recent years. Various improvements of ultrasound imaging as a diagnostic technique for medical decision-making have been established. Some of these improvements were with regard to ultrasound hardware/equipment, such as phased array transducers. Other improvements have included the introduction of signal processing algorithms that produced image enhancements, or more even, new forms of imaging such as color flow Doppler imaging.

Various methods to exploit the non-linear nature of ultrasonic propagation in tissue media are being used in an attempt to provide improved imaging techniques for enhancing ultrasonic imaging, with or without the use of contrast agents. For example, second harmonic imaging improves the image contrast by significantly reducing the acoustic clutter from intervening tissue layers. This is particular advantageous for difficult to image patients.

The simplest implementation of second harmonic imaging is the use of a post-beamforming bandpass filter to separate the second harmonic from the fundamental. The assumption is that if the transmitted imaging pulse is carefully designed to have frequency components in the band $f_0-B/2$ to $f_0+B/2$, then second-order linear effects produce new frequency components in the band $2f_0-B$ to $2f_0+B$. However, this technique puts significant constraints on the transducer bandwidth, $f_0-B/2$ to $2f_0+B$. Significant signal loss occurs since most transducers are not capable of supporting such a bandwidth.

Various enhancements have been made to this simple implementation of second harmonic imaging. For example, a pulse inversion technique has been proposed and described in Simpson et al., "Pulse Inversion Doppler: A New Method for Detecting Non-linear Echoes from Microbubble Contrast Agents," *IEEE Trans. On Ultrasonics, Ferroelectrics, and Frequency Control*, Vol. 46, No. 2, (1999), and also M. A. Averkiou, "Tissue Harmonic Imaging," 2000 *IEEE Ultrasonics Symposium*, Vol. 2, pp.1563–1572 (2000).

Further, other ultrasonic imaging techniques are moving rapidly towards employing post-beamforming filters combined with non-linear imaging modes. For example, in U.S. Pat. No. 6,290,647 B1 to Krishnan, entitled, "Contrast Agent Imaging with Subharmonic and Harmonic Signals in Diagnostic Medical Ultrasound," issued Sep. 18, 2001, a combination of the results of linear filtering of harmonic and subharmonic components are used to produce improved contrast imaging. Further, another ultrasound imaging approach is described in an article by Haider, B. and Chiao, R. Y., entitled "Higher Order Non-linear Ultrasonic Imaging," 1999 *IEEE Ultrasonics Symposium*, Vol. 2, pp 1527–1531 (1999).

However, such techniques and enhancements are not without their own limitations. For example, the approach of Haider and Chiao performs non-linear imaging by recognizing the non-linear behavior of the system as a static polynomial-type non-linearity. It does not recognize or take into consideration the dynamic behavior of the system.

Further, the approach by, for example, Haider and Chiao, and also the pulse inversion techniques, require the use of multiple transmits in the same direction for estimating coefficients of harmonic bases functions of the models utilized. When relying on the use of multiple transmissions, movement of the imaged region results in undesirable degradation of the image produced by the ultrasound system.

SUMMARY OF THE INVENTION

The present invention provides for ultrasound imaging through the use of a dynamic non-linear post-beamforming filter (e.g., based on a pth-order Volterra model) capable of separating the linear and non-linear components of image data, e.g., extracting the non-linear components of the image data. The techniques described are applicable to both tissue and contrast agent non-linearity, but are clearly not limited thereto. A system identification algorithm for deriving the filter coefficients is also provided. The filter-based approach is capable of extracting a broad band of frequencies that allow for contrast enhancement while preserving image detail. True non-linear interaction between these frequency components is accounted for with use of a pth-order Volterra filter.

A method for use in ultrasound imaging of matter in a region according to the present invention includes providing wave energy into the region. The wave energy has a pulse spectrum centered at a fundamental frequency. Wave energy returned from the region is transduced to form a set of receive signals and the set of receive signals are beamformed to provide beamformed data representative of at least a portion of the region. The linear and non-linear components of the beamformed data are separated based on a pth-order Volterra model, where p is equal to or greater than 2. At least the non-linear components of the beamformed data are processed for use in forming an image.

In one embodiment of the method, separating the linear and non-linear components of the beamformed data based on a pth-order Volterra model includes applying a second-order Volterra filter to the beamformed data. The second-order Volterra filter is preferably defined by coefficients for a linear filter kernel and a quadratic non-linear filter kernel.

In another embodiment of the method, separating the linear and non-linear components of the beamformed data based on a pth-order Volterra model includes applying a pth-order Volterra filter to the beamformed data, wherein the pth-order Volterra filter is defined by coefficients for at least one non-linear filter kernel of the pth-order Volterra filter. Further, the coefficients for the pth-order Volterra filter are determined using at least a two-dimensional autocorrelation. Singular value decomposition may also be used after performance of the autocorrelation.

In another embodiment of the method, processing at least the non-linear components of the beamformed data for use in forming an image includes comparing or compounding at least a portion of the non-linear components to at least a portion of the linear components for use in characterization of the matter in the region.

A system for use in ultrasound imaging of matter in a region according to the present invention includes an ultrasound transducer array having a plurality of transducer elements and pulse controller circuitry coupled to the ultrasound transducer array operable in a transmit mode to provide wave energy into the region. The wave energy has a pulse spectrum centered at a fundamental frequency. Further, the ultrasound transducer array is operable in a receiving mode to transduce wave energy returned from the region to form a set of receive signals. Further, the system includes a beamformer operable on the set of receive signals to provide beamformed data representative of at least a portion of the region and filter circuitry operable on the beamformed data to separate the linear and non-linear components of the beamformed data based on a pth-order Volterra model, where p is equal to or greater than 2. A processing apparatus is also provided that is operable to use at least non-linear components of the beamformed data in formation of an image.

In one embodiment of the system, the filter circuitry includes a second-order Volterra filter. Preferably, the second-order Volterra filter is defined by coefficients for a linear filter kernel and a quadratic non-linear filter kernel of the second-order Volterra filter.

In another embodiment of the system, a program is provided that is used to define coefficients for at least one non-linear filter kernel of the filter circuitry using at least two-dimensional autocorrelation. Singular value decomposition may also be used thereafter.

Yet another method for use in ultrasound imaging of matter in a region according to the present invention is described. The method includes providing wave energy into the region, wherein the wave energy has a pulse spectrum centered at a fundamental frequency. The wave energy returned from the region in response to a single pulse of wave energy is transduced to form a set of receive signals. The set of receive signals is beamformed to provide beamformed data representative of at least a portion of the region. Coefficients for at least one non-linear filter kernel of a pth-order Volterra filter bank are determined using the beamformed data, where p is equal to or greater than 2. The at least one non-linear filter kernel is applied to the beamformed data and at least the beamformed data filtered thereby is processed for use in forming an image.

In one embodiment of the method, applying the at least one non-linear filter kernel to the beamformed data comprises applying a quadratic non-linear filter kernel to the beamformed data based on a second-order Volterra model.

In another embodiment of the method, determining coefficients for the at least one non-linear filter kernel includes processing the beamformed data to provide at least one echographic image wherein the matter in the region can be perceived by a user, selecting at least a segment of the beamformed data from a contrast portion of the region where the matter is perceived, selecting at least a segment of the beamformed data from a normal portion of the region where the matter is not perceived, forming a linear system of equations based on the pth-order Volterra model, and providing a least squares solution to the linear system of equations to provide coefficients for the at least one non-linear filter kernel.

The solution generally is provided as a matrix including elements representative of the coefficients for the at least one non-linear filter kernel. The coefficients may be further defined by performing a two-dimensional autocorrelation on the matrix. Yet further, Singular value decomposition may be used to determine dominant eigenmodes for the matrix. Yet further, one or more eigenmodes may be identified and removed.

Further, the method may include providing regularization of the least squares solution. Such regularization may be provided, for example, by using single parameter and rank regularization guided by at least mean square error criterion and/or using single parameter and rank regularization guided by at least contrast to normal tissue ratio.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

DETAILED DESCRIPTION OF THE EMBODIMENTS

The present invention shall be generally described with reference to FIGS. 1–2. Thereafter, various additional embodiments and examples of the present invention shall be described with reference to FIGS. 1–6.

Figure 1:
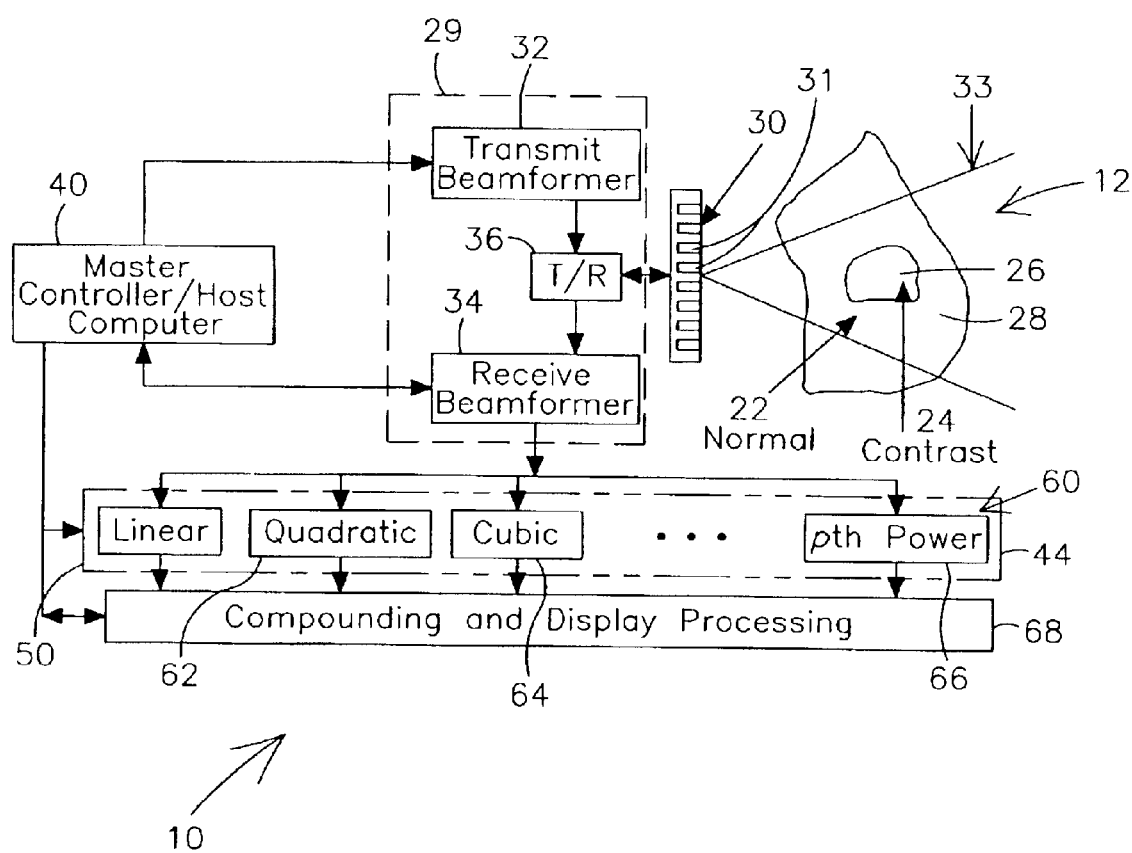
FIG. 1 is a block diagram illustrating one exemplary embodiment of an ultrasound imaging system according to the present invention.

FIG. 1 shows an illustrative ultrasound imaging system 10 according to the present invention. The ultrasound imaging system 10 provides for an improvement in medical ultrasound imaging through the use of a dynamic non-linear post-beamforming filter represented generally by linear and non-linear kernels of filter bank 44. The non-linear post-beamforming filter is capable of separating the linear and non-linear components of image data, e.g., beamformed data representative of RF echo, returned from the region 12 being imaged by the ultrasound imaging system 10.

The imaging systems and filtering methods described herein are beneficial for use in various applications. In other words, various applications will benefit from the utilization of a dynamic non-linear post-beamforming filter technique that is capable of separating the linear and non-linear components of image data as described herein.

Ultrasound imaging is a leading technique in the diagnostic imaging market and the present technique may be implemented on virtually any type of conventionally available ultrasound scanner apparatus using one or more software/hardware modifications, which may require minimal or no changes on existing architectures. In other words, one or more methods described herein may be implemented in one form or another on or in combination with any conventional ultrasound scanner. Many higher end scanners may be equipped with the hardware and computing power necessary for real-time implementation of the one or more algorithms described herein.

The present invention may not only find application in medical diagnostics, but may be used in various other markets. For example, one or more of the embodiments of the methods described herein may be used in non-destructive testing and evaluation industry, e.g., ultrasonic inspection of aircraft, semiconductors, concrete, etc.

In addition, the present invention may find application in other optical imaging systems. For example, optical coherence tomography (OCT) and coherent radar imaging may use one or more embodiments of the present invention. In other words, for example, the Volterra filter may be applied to image data captured in an optical coherence tomography process.

Further with respect to ultrasound imaging, the ultrasound imaging system 10 and/or methods described herein may be used for the enhancement of contrast agent echoes for applications in contrast agent imaging. Further, for example, enhancement of shadow regions associated with solid tumors being imaged with application in cancer detection may also benefit from the present invention. Yet further, for example, enhancement of shadow lesions associated with formation of thermal lesions (e.g., during RF ablation), such as in the application wherein a user is monitoring thermal surgery with ultrasound imaging, may also benefit. One skilled in the art will recognize that various images may be improved or enhanced using the present invention and that the present invention is not limited to any particular application.

Figure 2:
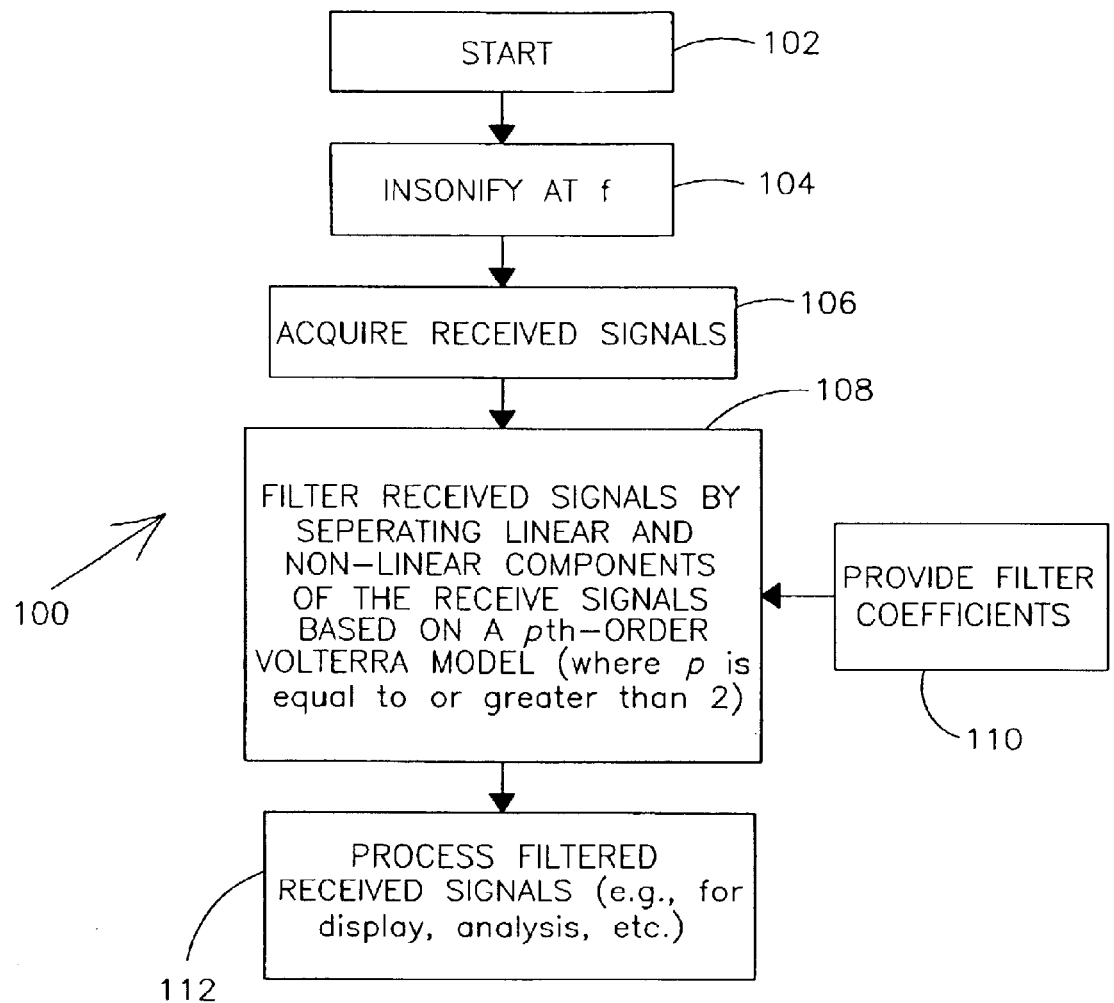
FIG. 2 is a general flow diagram of an illustrative ultrasound imaging method according to the present invention.

The illustrative ultrasound imaging system 10 is configured to carry out the ultrasound imaging method 100 as shown in FIG. 2. The ultrasound imaging method 100 includes starting the ultrasound imaging process (block 102) by insonifying at least a portion of region 12 (see FIG. 1) with acoustic wave energy having a pulse spectrum centered at a fundamental frequency, $f_0$ (block 104). Wave energy returned from the region 12 in response to the insonification (e.g., echo) is transduced to provide received signals (block 106). Such received signals, e.g., which may be operated upon by a beamformer, result in image data that may be filtered according to the present invention.

As further shown in FIG. 2, the received signals, e.g., image data, may be separated into linear and/or non-linear components of the received signals based on a pth-order Volterra model, where $p \geq 2$. Such filtering is preferably performed by applying a pth-order Volterra filter to the image data. The pth-order Volterra filter is defined by coefficients for a linear filter kernel (e.g., kernel 50 of FIG. 1) and one or more non-linear filter kernels (e.g., kernels 60 of FIG. 1) of the pth-order Volterra filter (e.g., filter bank 44 of FIG. 1). Such filter coefficients can be provided, e.g., identified, from wave energy (e.g., echo) returned in response to a single pulse of wave energy provided into the region 12.

The filtered received signals can then be processed and employed for various functions (block 112). For example, and preferably, at least one or more non-linear components of the filtered received signals are provided for display of an image based thereon. In addition, for example, the linear components and at least a portion of the non-linear components may be compounded and/or compared for use in analysis and/or display of images.

As shown in FIG. 1, the ultrasonic imaging system 10, which is operable to implement the method 100 of FIG. 2, includes transducer 30 along with transmit and receive (T/R) circuitry 29 for driving the transducer 30. The transmit and receive (T/R) circuitry 29 includes transmit beamformer 32, receive beamformer 34, along with other circuitry such as signal conditioning circuitry conventionally used for controlling transmission of ultrasound pulses and generating signal in response to returned echo. The transducer 30 is preferably a transducer array that includes a plurality of separately driven transducer elements 31, each of which produces a burst of acoustic energy when energized by a pulse waveform provided by a T/R circuitry 29.

In operation, with reference to one illustrative medical application of imaging a region 12 having a lesion therein, wave energy is provided from the transducer elements 31 into the region 12 that includes normal region 22 and contrast region 24. For example, the normal region 22 may include normal tissue 28, whereas the contrast region 24 may include a lesion region 26. In other words, for example, the region 12 from which the reflected energy is received can be referred to as an image region and may include blood, tissue, and a non-linear contrast agent.

The wave energy reflected back to the transducer elements 31 from the region 12 being imaged (e.g., echo) is converted to an electrical signal by each receiving transducer element 31 and applied separately to receiver components of the T/R circuitry 29 through a set of T/R switches 36 of the T/R circuitry 29. The T/R switches 36 may be diodes which protect the receive electronics from high voltages generated by the transmit electronics. For example, the transmit signal may cause the diodes to shut off and limit the signal to the receiver electronics.

T/R circuitry 29 is operated under control of master controller/host computer 40 (many times referred to herein as computer 40) responsive to commands by a human operator. For example, a user interface is generally provided for input of one or more various parameters, selection choices, etc. A complete scan may be performed by acquiring a series of echoes in which the transmitter electronics of the T/R circuitry 29 is gated on momentarily to energize each transducer element 31 and the subsequent echo signals produced by each transducer element 31 are applied to receiver electronics of T/R circuitry 29. A channel corresponding to each transducer may begin reception while another channel is still transmitting. Receiver circuitry of T/R circuitry 29 combines the separate echo signals from each transducer element to produce a single echo signal which is used to produce a lock in an image, e.g., an image to be displayed on a display monitor (not shown).

Under the direction of the master controller/host computer 40, transmitter circuitry of T/R circuitry 29 drives transducer 30 such that the ultrasonic energy is transmitted as a directed focused beam 33. To accomplish this, respective time delays are imported to a plurality of pulsers by a transmit beamformer 32 of T/R circuitry 29. Master controller/host computer 40 determines the conditions under which the acoustic pulses will be transmitted. With this information, transmit beamformer 32 determines the timing and amplitudes of each of the transmit pulses. By appropriately adjusting the transmit focus time delays in a conventional manner and other parameters, an ultrasonic beam can be directed and focused to form a transmit beam 33.

The echo signals produced by each burst (i.e., pulse) of ultrasonic energy reflect from matter located at successive ranges along each transmit beam. The echo signals are sensed separately by each transducer element 31 and a sample of the magnitude of the echo signal at a particular point in time represents the amount of reflection occurring at a specific range. Due to differences in the propagation paths between a reflecting point and each transducer element 30, the echo signals will not be detected simultaneously and their amplitudes will not be equal. Receiver circuitry of T/R circuitry 29 amplifies the separate echo signals which are fed to a receive beamformer 34. Each receiver channel of the receive beamformer may be coupled to a respective transducer element 31 of transducer 30, e.g., by an amplifier (not shown).

Under the direction of the master controller/host computer 40, receive beamformer 34 tracks the direction of the transmitted beam, sampling the echo signals at a succession of ranges along each beam. Receive beamformer 34 imports the proper time delays and other receive parameters for each amplified echo signal, and sums the delayed echo signals to provide a summed echo signal which accurately indicates the total ultrasonic energy reflected from a point located at a particular range along one ultrasonic beam. The received focus time delays are computed in real-time using specialized hardware or are read from a look-up table. The received channels may also have circuitry for filtering the received pulses, e.g., noise filters. The summed time-delayed receive signals are supplied to a signal processor, which as shown in FIG. 1 is master controller/host computer 40. The host computer 40 converts the summed receive signals to display data.

The components of the ultrasound imaging system 10 so far described provide for a standard architecture of a pulse echo ultrasonic imaging system. Such components of the ultrasound imaging system 10 thus far described, excluding the filter bank 44 and certain software that will be described further below which forms a part of master controller/host computer 40, generally take the form of any standard architecture that may be beneficially modified according to the present invention. In other words, standard transducers, transmit and receive beamformers, and other devices necessary to provide a standard pulse echo ultrasonic image on a display can be used according to the present invention.

Transducer 30 may comprise any suitable array of transducer elements. For example, the transducer 30 may be a phased array of transducer elements in one of various formats, such as a linear array, curvilinear array, a Vector® wide view array, an annular array, a radial array, etc. As such, the present invention is not restricted or limited to any particular transducer 30.

In addition, for example, transmit beamformer 32 may be any beamformer that causes transmit waveforms to be provided to transducer 30 causing transducer 30 to emit ultrasonic pulses centered at a selected fundamental frequency into the region 12. Further, receive beamformer may be any beamformer that is able so sum the various transducer signal components and provide suitable beamformed data to computer 40 to be operated upon, for example, so as to determine coefficients for the filter bank 44. The receive beamformer 34 is responsive to energy at the same frequency as that applied to the transducer 30 by the transmit beamformer 32, e.g., the fundamental frequency, as well as a different frequencies that are harmonically related to the transmit frequency, e.g., non-linear components. Various beamformers are available and the present invention is not limited to any particular transmit or receive beamformer. For example, various beamformers are described in Kai Thomenius, "Evolution of Ultrasound Beamformers," 1996 IEEE International Symposium, Vol. 2, pp. 1615–1622 (1996).

As described above, the beamformed data provided to the master controller/host computer 40 may also be provided by receive beamformer 34 under control of master controller/host computer 40 to post-beamforming pth-order Volterra filter bank 44. The post-beamforming Volterra filter bank 44 is a dynamic non-linear post-beamforming filter capable of separating the linear and non-linear components of the beamformed data. As used herein, a post-beamforming Volterra filter refers to any dynamic non-linear post-beamforming filter capable of providing such separation. Such dynamic non-linear post-beamforming filters deal with underlying non-linearity as a process with finite or infinite memory. Volterra filter kernels of the Volterra filter, at appropriate orders, can be designed to extract signal components with sample-to-sample interaction on that order, e.g., quadratic, up to the Mth sample, where M is the memory of the system. Therefore, the term dynamic used herein is a description of the system model in the same sense as physical systems are described as static and dynamic. The term dynamic is not related to the process commonly known as dynamic focusing whereby the "receive" focus delays and element weights are updated as a function of depth. However, it is possible to implement these filters in an adaptive or recursive mode if desired.

The pth-order Volterra filter bank 44 includes a plurality of filter kernels including a linear kernel 50 and one or more non-linear kernels 60. The one or more non-linear kernels 60 may include, as shown in FIG. 1, a quadratic filter kernel 62, cubic filter kernel 64, . . . a pth-power filter kernel 66.

The Volterra filter kernels of the filter bank 44, at any order, can be used to filter the beamformed data provided from receive beamformer 34 under control of master controller/host computer 40. The output of the filtered beamformed data, through any of the filter kernels, e.g., 50, 62, 64, etc., can be used to produce an image. In other words, the output of the filtered beamformed data, through any filter kernel, can be used alone or in combination upon processing by compounding and display processing routines under control of master controller/host computer 40 to display an image. For example, the beamformed data filtered by quadratic filter kernel 62 may be used to provide a display of region 12. In other words, the beamformed data provided from received beamformer 34 can be operated on in parallel by the various filter kernels of filter bank 44. As a result thereof, one or more of the outputs from the various filter kernels can be used alone or in combination with one or more outputs from the other filter kernels.

In one embodiment, preferably, at least the quadratic non-linear filter kernel 62 provides an output that is processed for display of an enhanced image relative to a previously displayed standard echographic image. As indicated above, the output of the quadratic filter kernel 62 may be compounded with another non-linear component resulting from the application of the cubic filter kernel 64 or other available non-linear filter kernels 60.

Further, the non-linear components of the beamformed data provided from one or more outputs of the non-linear filter kernels 60 (e.g., quadratic filter kernel 62, cubic filter kernel 64, etc.) can be compounded or compared with the output of the linear filter kernel 50. For example, a ratio of the output of the quadratic linear filter kernel 62 to the output of the linear filter kernel 50 can be used to provide data representative of the B/A coefficient which provides a measure of tissue non-linearity, believed to be an important tissue characterization parameter. B/A is the ratio of the quadratic to the linear component in the Taylor series expansion of the equation of state P=P($\rho$,s), where P is the pressure, $\rho$ is density and s is entropy.

Such compounding or comparison of data from one or more filter kernels with one or more different or same filter kernels may take the form of a ratio, a difference, an addition, and/or any other use of the filtered outputs of one or more non-linear filter kernels 60 in combination with the output from linear filter kernel 50 or any other outputs of different or same filter kernels 60.

A Volterra filter or series represents a wide class of non-linear systems. The series is a sum of generalized convolution and can be thought of as an extension of the linear case. Generally, Volterra filters may include a large number of filter coefficients. However, preferably, according to the present invention, lower orders of non-linearity and/or shorter memory for the dynamic model are used to reduce the number of necessary filter coefficients.

The filter bank 44 may be implemented as any programmable filter wherein linear and non-linear filter kernels are defined by coefficients. The filter bank may be either a finite impulse response (FIR) or an infinite impulse response (IIR) filter. Preferably, the filter is a programmable digital filter, although any type of filter capable of performing the functionality as described herein may be used.

For example, the Volterra filter can be implemented as a finite-impulse response (FIR) or infinite-impulse-response (IIR) in a manner similar to the well-known linear filters. These implementations can be efficiently realized using, for example, the pipelined architecture for adaptive normalized least mean square algorithm as described in Harada, Muneyasu, and Hinamoto, "A pipeline architecture of quadratic adaptive Volterra filters based on NLMS algorithm," 2001 IEEE Int. Symp. on Circuits and Systems (ISCAS 2001), vol. 2, pp. 785–788 (2001).

Alternatively, the Volterra filter can be implemented in the frequency domain using modified overlap-add or overlap-save methods similar to the linear case as described in Shcherbakov, "A parallel architecture for adaptive frequency-domain Volterra filtering," Proc. IEEE Digital Signal Processing Workshop, pp. 203–206 (1996).

The coefficients for the Volterra filter bank 44, i.e., coefficients for the linear filter kernel 50 and non-linear filter kernels 60, can be identified from a single transmit pulse as further described below. The identification of the coefficients for the filter kernels is the necessary requirement for providing separation of the non-linear and linear components of the beamformed data when the linear and non-linear filter kernels 50, 60 are applied to the beamformed data.

The following provides a general explanation of the implementation of the pth-order Volterra filter including the identification of coefficients for the filter. Generally, a pth-order finite memory Volterra filter has the following input (u) output (y) relationship:

$$y[k] = \sum_{n=1}^{p} \sum_{i_1=0}^{M} \sum_{i_2=0}^{i_1} \ldots \sum_{i_n=0}^{i_{n-1}} h_{ntri}[i_1, \ldots , i_n]u[k-i_1] \ldots u[k-i_n]$$

where p is the degree of non-linearity and M is the order of the system (e.g., a finite memory system). For simplicity, but without loss of generality, the zeroth-order (i.e., dc) term was ignored and the kernels were assumed to be triangular (hence the tri subscript in the definition of these kernels). This applies to the second-order and higher order kernels.

Although the present invention may employ higher order filter kernels, for simplicity, our description herein is focused on the second-order Volterra filter since the simplest implementation of a non-linear Volterra system is the second-order Volterra filter (SVF) given by:

$$y[k] = \sum_{i_1=0}^{M} h_1[i_1]u[k-i_1] + \sum_{i_1=0}^{M}\sum_{i_2=0}^{i_1} h_{2tri}[i_1, i_2]u[k-i_1]u[k-i_2]$$

This relationship can be represented in matrix form as follows:

$$y = Uh$$

where:

$$y = [y[0] y[1] \ldots y[K]]^T$$

$$h = [h_1[0] h_1[1] \ldots h_1[M] h_{2tri}[0,0] h_{2tri}[1,0] h_{2tri}[1,1] \ldots h_{2tri}[M, M]]^T$$

-continued $$U = \begin{bmatrix} u[0] & u[1] & u[2] & \cdots \\ 0 & u[0] & u[1] & \cdots \\ 0 & 0 & u[0] & \cdots \\ \vdots & \vdots & \vdots & \cdots \\ u^2[0] & u^2[1] & u^2[2] & \cdots \\ 0 & u[0]u[1] & u[1]u[2] & \cdots \\ \vdots & u^2[0] & u^2[1] & \cdots \\ \vdots & \vdots & \vdots & \vdots \end{bmatrix}$$

The basic idea of the filter-based approach according to the present invention is to identify the coefficients of the vector h from received RF beamformed data using a minimum order filter capable of predicting the next sample from the most recent K values of the data with minimum error based on some well-defined error criterion, e.g., least squares. This is similar to the linear prediction system identification approach used in the signal processing field.

One approach to this problem is to solve the set of algebraic equations in matrix form as follows:

$$\hat{h} = (U^T U)^{-1} U^T y$$

assuming the inverse exists. In practice, the matrix U may be ill-conditioned and a regularized version of the inverse can be obtained using a variety of methods, e.g., singular-value decomposition. If this approach is used, the solution found is optimal in the minimum-norm least squares sense. There are many optimality criteria that may be invoked and that may lead to different solutions. Generally, the main idea behind various approaches to solving the equations is that the equation Uh=y is used as a constraint on the solution. For simplicity and for sake of concreteness, the present invention is illustrated by describing solutions that are optimal in the least squares criterion.

This approach is distinctly different from the approach of Haider and Chiao described in the background section herein in that the echo in Haider and Chiao is assumed to be a sum of harmonic bases functions of a "memoryless" system. This is a fundamental difference that has important implications on both the system identification and implementation aspects of the filter-based approach. It also requires the use of multiple transmits in the same direction for estimating the coefficients of the harmonic bases functions while the present invention can identify the model coefficients from any single input. This is due to the fact that our formulation exploits the sample-to-sample interaction in the same sequence of beamformed data samples (e.g., at quadratic and higher order terms).

Figure 3:
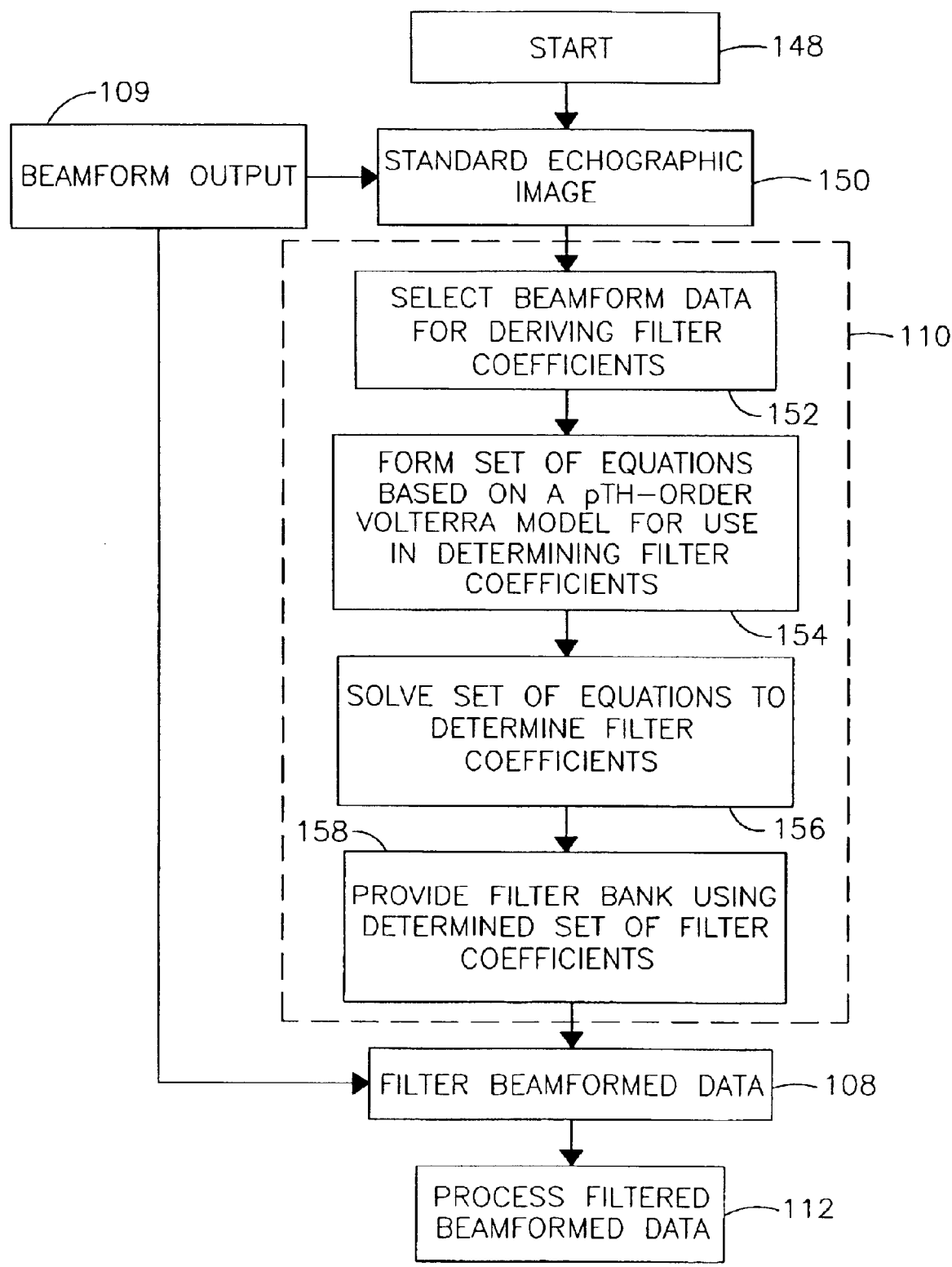
FIG. 3 is a more detailed flow diagram of a portion of the ultrasound imaging method of FIG. 2 showing an illustrative filter coefficient determination process.

FIG. 3 shows an illustrative embodiment of an image process including a method for providing filter coefficients (dashed block 110), as generally shown in FIG. 2. At the start of the process (block 148), conventional beamformed output is provided (block 109) for use in the process, e.g., display of a standard echographic image (block 150). A user then, with the provided image, e.g., displayed image, and user interfaces which are typically and conventionally provided in standard ultrasound systems, proceeds to select beamformed data for deriving the filter coefficients (block 152). A set of equations based on a pth-order Volterra model is formed for use in determining filter coefficients (block 154). The set of equations is then solved, preferably using least squares analysis (block 156). Thereafter, a filter bank is provided using the determined set of filter coefficients (block 158). As previously described herein, each of the filter kernels of the filter bank are then used, e.g., in a parallel manner, to filter the beamformed data (block 108) and thereafter the filtered beamformed data is processed 112 for use in one or more applications, e.g., forming an image, characterizing matter in the region being imaged, etc.

The above process will become more clear upon illustration of a particular and more specific embodiment according the present invention. For example, one particular embodiment of applying a post-beamforming non-linear filtering algorithm based on a second-order Volterra filter model that separates the linear and quadratic components of the echo signal leading to significant enhancement of lesion visualization shall be described with reference to FIG. 4.

Figure 4:
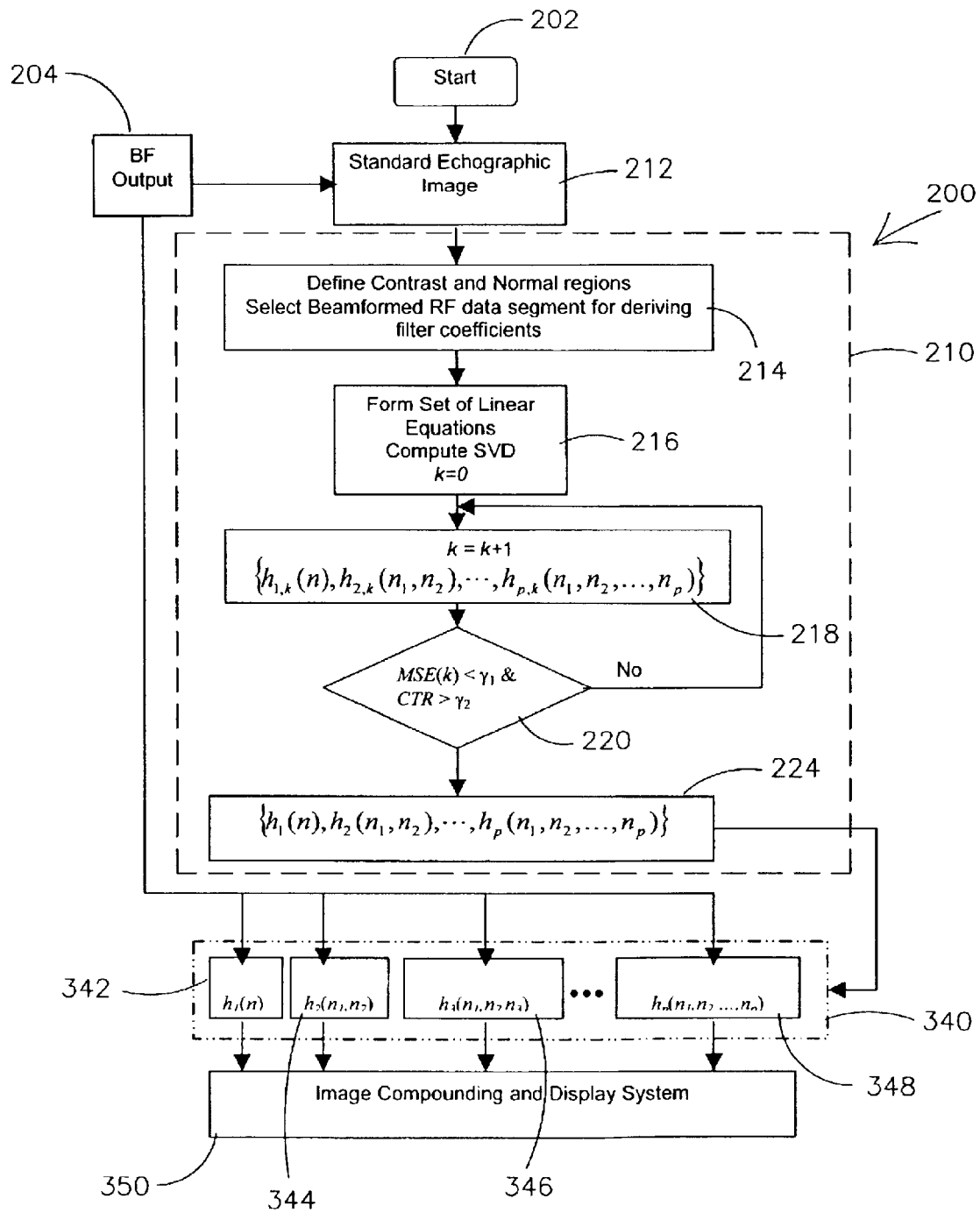
FIG. 4 is one illustrative exemplary embodiment of an ultrasound imaging method with a coefficient determination process utilized therewith.

FIG. 4 provides various details with respect to the determination of coefficients for a pth-order Volterra filter bank (e.g., such as filter bank 44 of FIG. 1) for use in an ultrasound imaging method 200. The ultrasound imaging system 10 as shown generally in FIG. 1 may be used for implementing the method 200 of FIG. 4, as well as various other modified conventional ultrasound systems. For example, one illustrative embodiment of portions of a system 10 (see FIG. 1) are shown by the partial system 300 of FIG. 5 which will be used to describe the imaging method 200. According to this illustrative embodiment, the imaged region includes at least a normal tissue region and a contrast region, e.g., a lesion, as shown by region 12 of FIG. 1.

Although FIG. 4 shows equations for determining coefficients for a pth-order filter, the description of the imaging method 200 shall be focused on a second-order filter configuration. However, it will be recognized that any order Volterra filter may be employed as is generally represented by the filter kernels of a third-order filter kernel 346 and nth-order filter kernels 348 of the filter bank 340 shown in FIG. 4.

As background, and with respect to a noninvasive thermal surgery application, it is generally recognized that thermal lesions, e.g., lesions formed with high intensity energy such as during an ablation therapy routine, exhibit non-linear behavior as a propagation medium for ultrasonic imaging. It is desirable to provide visualization of the procedure to provide guidance during the ablation routine. Although conventional second harmonic imaging of freshly formed thermal lesions has consistently shown some enhancement in their visualization confirming the non-linear behavior, the present invention using post beamforming Volterra filtering which separates the linear and non-linear components of the echo signal leads to even further significant enhancement of lesion visualization. For example, quadratic component images show significant enhancement in lesion visualization due to direct exploitation of the non-linear nature of freshly formed thermal lesions (e.g., possibly due to formation of microbubbles) and the fact that quadratic component images combine both low frequency (close to dc) and harmonic frequency in forming non-linear echoes. This simultaneously reduces speckle and beamforming artifacts without loss in spatial resolution. Further, the quadratic kernel of the second-order Volterra filter rejects the additive white Gaussian noise components which significantly improves the signal to noise ratio of the imaging system and enhances the visualization of low echogenicity regions in the image.

Figure 5:
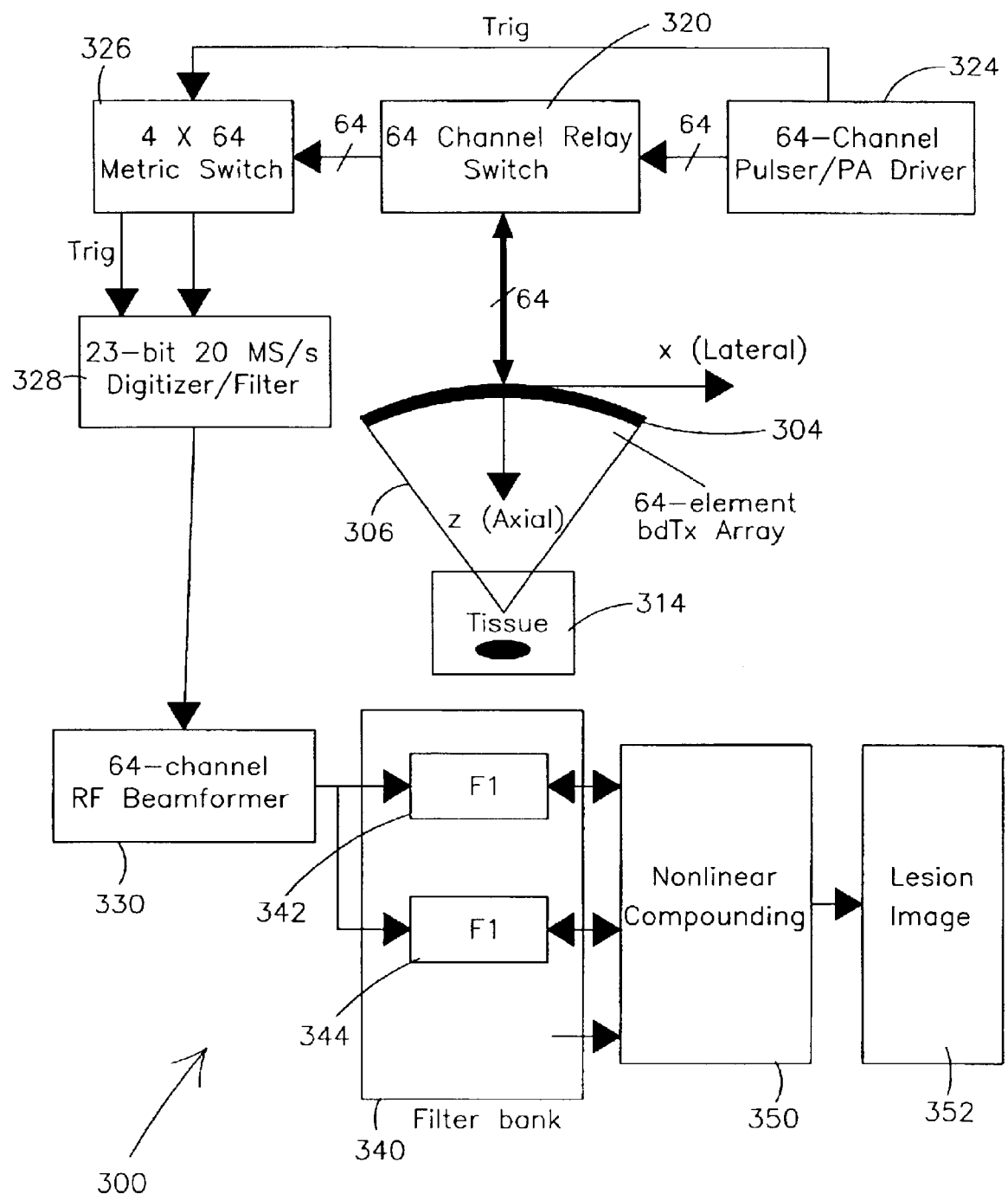
FIG. 5 shows a block diagram of one illustrative embodiment of various components of an ultrasound imaging system generally shown in FIG. 1 for use in describing the method of FIG. 4.

As shown in the partial system 300 of FIG. 5, an illustrative portion of an ultrasound imaging system 300 for use in implementing the process 200 for visualization during an ablation therapy session as described above includes a 64-element transducer array 304. In addition to using the transducer array 304 for providing ultrasound imaging capabilities, the array may also be optimized for maximum energy delivery at 1 MHz operating frequency to form lesions in the sample tissue 314, e.g., lesions to be imaged during an ablation procedure according to the present invention. Lesions may be formed by focusing the array at a point within the target and maintaining high power output for time intervals on the order of seconds.

To acquire image data of the region being imaged, over relatively short intervals of time (e.g., milliseconds), short (e.g., microsecond) pulses of wave energy are transmitted from all 64 elements of the transducer array 304 and returned wave energy, e.g., echoes, are received on selected elements of the transducer array 304. The 64-channel relay switch 320 and the matrix switch 326 allow the 64-channel driver 324 to drive all 64-channels with short (e.g., microsecond) pulses on transmit and select one of the 64 transducer elements on receive. The RF data received on this channel is routed to the digitizer/filter 328 for use in subsequent beamforming by 64-channel beamformer 330. In the illustrative implementation shown in FIG. 5, the process of transmit and receive is repeated 64 times to produce a full data set for one transmit focus. However, preferably, the embodiment shown in FIG. 5 is modified so that RF data received from all 64 channels is digitized and fed to the beamformer simultaneously for real-time operation.

Once the echo is collected and digitization is completed (e.g., using digitizer/filter 328), the imaging method 200 is started (block 202 of FIG. 4), and RF beamforming is performed, for example, by 64-channel beamformer 330 to provide a beamformer output (block 204 of FIG. 4) used to form standard echographic images (Block 212 of FIG. 4) of the target region 314 including normal tissue and contrast region in the form of a lesion.

The conventional beamformer output is provided (block 204) for use in the process 200, e.g., display of the standard echographic image (block 212), such as for use in the coefficient determination process (dashed block 210). For example, regions may be selected as being a contrast region or a normal region for use in the determination of coefficients, e.g., when CTR is used to guide regularization as further described herein. For example, a user when provided with a standard echographic image on a display may use a user interface of the ultrasound system to select beamformed data for deriving the filter coefficients (block 214). As shown in block 214, further, the user preferably defines contrast and normal tissue regions.

Further, the beamformer output (block 204) may be provided to filter bank 340 such that linear filter kernel 342 and non-linear quadratic filter kernel 344 can be applied thereto, preferably independently of one another. A filter output from each kernel may then be provided to image compounding and display system for display of an image 352 based on the filtered beamformer output or outputs.

The beamforming filter bank 340 preferably provides for filtering of the beamformed data from 64-channel RF beamformer 330 as previously described herein. In other words, filter bank 340 processes the beamformed data from beamformer 330 in a parallel fashion utilizing linear filter kernel 342 and non-linear quadratic filter kernel 344. In this particular embodiment, wherein the Volterra filter is based on a second-order Volterra model, only a quadratic filter kernel 344 is applicable. The filtered beamformed data is then provided for processing by routines 350 for display of a lesion image 352.

In this illustrative embodiment, only the output of the quadratic non-linear filtered beamformed data from non-linear quadratic filter kernel 344 is used for image formation. However, such filter data may be compounded with and/or compared with the filtered data from linear filter kernel 342 for use in other applications as described herein, e.g., B/A coefficient determination, etc.

With further reference to the ultrasound imaging method 200, the decomposition of received echo, i.e., output sequences, into linear and quadratic components by using a least squares approach of second-order Volterra model is considered in detail below, with the primary emphasis on determination of the coefficients (block 210) of the linear and quadratic components of the second-order Volterra filter model which are obtained with use of the beamformed output 204. The coefficient determination method for determining the coefficients for the second-order Volterra filter (e.g., 340) for pulse echo ultrasound imaging data is generally represented in the illustrative dashed block 210.

The coefficients of the linear and quadratic components of the second-order Volterra filter model are obtained using the beamformed RF data 204 in the following illustrative manner. Generally, the implementation of the coefficient determination process 210 is as follows:

1. Using the standard echographic image, select a beamformed RF data segment from the expected lesion location (block 214). This is possible as a user will generally be able to see the lesion, although not clearly, on the displayed standard echographic image.
2. Form a system of linear equations (as further described below) (block 216).
3. Define a contrast region (e.g., within the lesion region) and normal tissue region for the computation of mean square error criterion (MSE) and contrast to tissue ratio (CTR) (block 214). Again, this is possible as a user will generally be able to see the lesion and the normal tissue regions, although not clearly, on the displayed standard echographic image.
4. Solve the system of linear equations using a regularization method (e.g., truncated singular value decomposition (TSVD)). Determine truncation parameter (blocks 216, 218, and 220).
5. Provide coefficients to be used for second-order Volterra filter to be applied to the beamformed RF data throughout the pulse-echo ultrasound image (block 224).

The implementation of the coefficient determination method 210 is provided in more mathematical detail below. The response of a quadratically non-linear system, y(n+1), can be predicted by a second-order Volterra model of past values as follows:

$$y(n+1) = \sum_{i=0}^{m-1} y(n-i)h_L(i) + \sum_{j=0}^{m-1}\sum_{k=j}^{m-1} y(n-j)y(n-k)h_Q(j,k) + \varepsilon(n)$$

where $h_L(i)$ is linear filter coefficients, $h_Q(j,k)$ represents quadratic filter coefficients, and $\varepsilon(n)$ is a modeling error and/or a measurement noise which is assumed to be an independent, identically distributed (i.i.d.) random variable with zero mean. A linear equation in terms of unknown filter coefficients can be written as:

$$y(n+1) = y(n)h + \varepsilon(n)$$

where past data vector y(n) is defined at time n as:

$$y(n) = [y(n), y(n-1), y(n-2), \ldots, y(n-m+1), y^2(n), y(n)y(n-1), \ldots, y^2(n-m+1)]^T$$

and the filter coefficient vector h represents:

$$h=[h_L(0), h_L(1), h_L(2), \ldots, h_L(m-1), h_Q(0,0), h_Q(0,1), \ldots, h_Q(m-1, m-1)]^T$$

Note that m is the system order, N is the total number of filter coefficients, which is equal to $(m^2+3m)/2$ assuming symmetrical quadratic kernel, and superscript T is the transpose of a vector or a matrix.

To find filter coefficients, a system of linear equations are formed as follows:

$$f=Gh+\epsilon$$

where the vector f, the matrix G, and the error vector $\epsilon$ are:

$$f=[y(n+1), y(n+2), \ldots, y(n+L)]^T$$

$$G=[y(n), y(n+1), \ldots, y(n+L-1)]^T$$

$$\epsilon=[\epsilon(n), \epsilon(n+1), \ldots, \epsilon(n+L-1)]^T$$

Solutions to the system of linear equations can be provided by least squares (LS) solution for the over-determined case and minimum norm (MN) solution in the underdetermined case. A minimum norm least squares (MNLS) solution can be obtained by:

$$h_{MNLS}=G^\dagger f$$

where $G^\dagger$ is a generalized inverse. Assuming G has rank $r \leq L$, the singular value decomposition (SVD) of G can be expressed as:

$$G = U\sum V^T = \sum_{i=1}^{r} \sigma_i u_i v_i^T$$

where $\Sigma$ is a L×N diagonal matrix with singular values $\sigma_1 \geq \sigma_2 \geq \ldots \geq \sigma_r > \sigma_{r+1} = \ldots = \sigma_L = 0$, U and V are unitary matrices, and $u_i$ and $v_i$ are the orthogonal eigenvectors of $GG^T$ and $G^TG$, respectively. The minimum norm least squares solution is then given by:

$$h_o = G^\dagger f = \sum_{i=1}^{r} \frac{u_i^T f}{\sigma_i} v_i$$

SVD of G forms a basis for regularization.

There are a number of approaches for regularization of the solution including single parameter and rank reduction regularization. The latter, sometimes referred to as the truncated singular value decomposition (TSVD), produces a solution by truncating a number of single modes of G with the smallest singular values below a certain threshold. The kth order TSVD solution is defined by:

$$h_k = \sum_{i=1}^{k} \frac{u_i^T f}{\sigma_i} v_i$$

where the truncation parameter k, also known as the rank of approximation, is the number of singular modes used to compute the estimate.

The regularization may be guided by the mean square error criterion:

$$MSE(k) = 10\log_{10}\left(\frac{\|f - Gh_k\|_2^2}{L}\right)$$

where $\|\cdot\|_2$ is the $l_2$ norm (block 220). This quantity decreases monotonically with k.

An auxiliary criterion for choosing an appropriate value of k is the contrast to tissue ratio:

$$CTR = 10\log_{10}\left(\frac{\|y_{QC}\|_2^2}{\|y_{QT}\|_2^2}\right)$$

where $\|y_{QC}\|_2$ and $\|y_{QT}\|_2$ are the $l_2$ norms of quadratic components from the contrast and normal tissue regions, respectively (block 220). These regions are easily identified under various imaging conditions. For instance, the contrast region is the expected location of the thermal lesion (often visible on the standard echographic image).

The advantage of including the CTR in the regularization process is twofold. It provides a quantitative measurement of performance (i.e., specificity) that is to be maximized by the quadratic filter (or in other cases, more generally the pth-power filter). Further, since the MSE is monotonically nondecreasing in k, a stopping criterion is needed. This is due to the fact that the TSVD solution may become more sensitive to noise at high values of k leading to decreased specificity.

Figure 6:
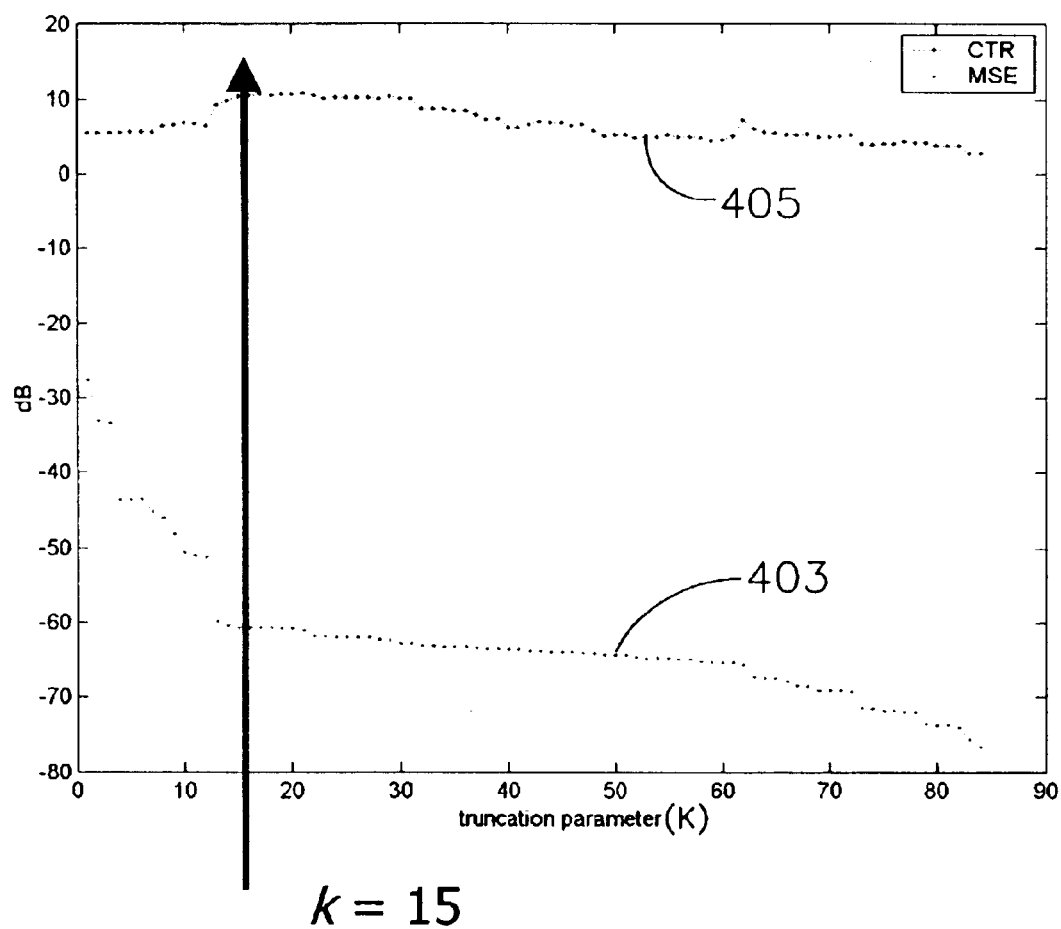
FIG. 6 shows one example of how CTR and MSE can be used to choose a truncation parameter such as used in the method shown generally in FIG. 4.

FIG. 6 shows an example of how CTR can be used to choose k appropriately. Note that the MSE 403 decreases dramatically with k (i.e., the truncation factor) for smaller values of k, but does so slowly after k=12. The CTR 405, on the other hand, achieves its maximum value at k=15 and decreases after that. Without the CTR, one may be tempted to compute a TSVD solution with k of, say, 62 or higher as the MSE continues to drop. In this case, the TSVD solution with the lowest rank (k=15) is selected. This solution maximized the CTR or the specificity while minimizing the sensitivity to noise. This is important because, as can be seen from the FIG. 6, the CTR is practically the same for values of k between 15 and 21.

It must be noted that one may use a variety of methods to obtain a regularized solution to the set of equations involving the Volterra kernels. Examples are linear or non-linear programming in cases when certain constraints on the filter coefficients are known to apply (e.g., positivity) or penalized maximum likelihood when known statistical properties of the data can be incorporated. An obvious modification of the TSVD method is the solution to a constrained optimization problem of the form $$\min_{h_Q} R^2 \text{ subject to } Gh = f$$

where $R^2$ is an appropriately chosen quadratic ratio to be minimized. For example, $R^2$ can be chosen to reflect the inverse of the CTR before log compression. In general, it can be any quantity that depends on the solution $h_Q$ that is to be minimized. This leads to a modified form of the TSVD given here:

$$h_k = \sum_{i=1}^{k} \frac{\sigma_i}{\sigma_i^2 + \gamma R_i^2} u_i^T f v_i$$

where g is an appropriately chosen threshold and $R_i^2$ is quadratic ratio resulting from the quadratic kernel obtained from the ith singular mode.

Regardless of the regularization procedure, the fundamental result here is the use of the linear/quadratic prediction to obtain a set of independent equations that can be solved robustly to obtain the Volterra filter kernels.

As described above, the filter coefficient vector hk for the Volterra filter kernels is in the form of:

$$h = [h_L(0), h_L(1), h_L(2), \ldots, h_L(m-1), h_Q(0,0), h_Q(0,1), \ldots, h_Q(m-1, m-1)]^T.$$

That is, for the second-order Volterra filter used here for illustrative purposes, the vector h contains the elements representative of the coefficients of the linear filter kernel 342 and the elements representative of the coefficients for the quadratic filter kernel 344 as shown in FIG. 4. In other words, the elements, $h_L(i)$, are representative of the coefficients of the linear filter kernel 342. On the other hand, the elements, $h_Q(I,j)$, are representative of the coefficients of the non-linear quadratic filter kernel 344. In FIG. 4, such elements generally correspond to $h_F(I,j)$). The elements, $h_Q(I,j)$, representative of the coefficients of the non-linear quadratic filter kernel 344 can be arranged in matrix form as follows:

$$Q = \begin{bmatrix} h_Q(0,0) & h_Q(0,1) & \cdots & h_Q(0,m-1) & h_Q(0,m) \\ h_Q(1,0) & h_Q(1,1) & & \vdots & \vdots \\ \vdots & \vdots & \ddots & \vdots & \vdots \\ h_Q(m-1,0) & h_Q(m-1,1) & \cdots & h_Q(m-1,m-1) & h_Q(m-1,m) \\ h_Q(m,0) & h_Q(m,1) & \cdots & h_Q(m,m-1) & h_Q(m,m) \end{bmatrix}$$

The elements, $h_Q(I,j)$, representative of the coefficients of the non-linear quadratic filter kernel 344, derived according to the procedure described above, has been shown to be sensitive to the quadratic signal components and can be used to produce high contrast images of the contrast and tissue media.

However, with further processing of the non-linear quadratic filter kernel matrix Q (e.g., operations being performed thereon as shown generally by the dashed box 210 in method 200 of FIG. 4), measurable improvement in the quality of the images from the quadratic filter kernel 344 in terms of spatial and contrast resolution can be attained. This is especially beneficial when the image being provided by the system 350 is based only on the information from quadratic filter kernel 344, as opposed to such information being compounded with data from the linear filter kernel 342, or compounded with other higher order non-linear filter kernel data when a higher order Volterra filter bank is used. Further, as described below, such operations may lead to a computationally efficient implementation of the quadratic filter kernel 344. It will be recognized that the processing described herein may be extended to cover the case of a higher order Volterra filter kernel, e.g., cubic or pth-order, as well as the quadratic kernel.

The processing of the matrix Q that results in the additional improvements includes performing a two-dimensional (2D) autocorrelation on matrix Q to produce quadratic filter kernel matrix $Q_s$. The new quadratic filter kernel matrix $Q_s$ has, essentially, the same magnitude response in the bifrequency plane as Q. In other words, it has essentially the same sensitivity to quadratic signal components. However, the higher-order coefficients of the matrix $Q_s$ are much better behaved and are effective at significantly reducing ringing effects in images resulting from application of the quadratic filter kernel 344. Ringing effects result from the use of filters with inappropriately truncated kernels (e.g., linear or higher order). Ringing occurs near sharp edges in the image and is detrimental to both spatial and contrast resolution of the filtered image.

Two-dimensional auto-correlation is a common signal and image processing technique. For example, it is described in the textbook, *Digital Image Processing*, by W. K. Pratt, $2^{nd}$ Edition, Wiley Interscience, page 578 (1991).

The 2D autocorrelation can be repeatedly used on the matrix $Q_s$, if necessary, to achieve the desired behavior of the coefficients for the quadratic filter kernel. In one embodiment, one or two applications of the 2D autocorrelation may be sufficient to provide effective filter coefficients.

Once an acceptable matrix $Q_s$ is obtained (e.g., using one or two applications of the 2D autocorrelation), a singular value decomposition (SVD) (e.g., an eigenvalue decomposition (EVD) which is a special case of the SVD for square symmetric matrices) can be performed to determine the matrix's dominant eigenmodes (e.g., based on eigenvalue distribution).

Using an SVD provides one or more of the following advantages. For example, using SVD, those eigenmodes that do not lead to an improvement in CTR can be identified and removed. These eigenmodes that are removed are eigenmodes that may either be sensitive to noise or to coupling from the linear component of the echo data.

Further, in cases when only one or two dominant eigenmodes of matrix $Q_s$ produce most of the energy in the images resulting from the application of the quadratic filter kernel 344 to the beamformed data, it is possible to implement the quadratic operator of the filter kernel 344 more is efficiently. Specifically, for example, a separable implementation of the low-order quadratic filter kernel 344 can be used.

To demonstrate such an implementation, suppose matrix $Q_s$ has the following SVD:

$$Q_s = \sum_{i=1}^{M} \lambda_i v_i v_i^{*t}$$

where $v_i$ is the ith eigenvector of the matrix $Q_s$ and M its dimension. The image output after application of the quadratic filter kernel 344 based on the SVD of matrix $Q_s$ can be given by:

$$y_Q(n) = \sum_{i=1}^{M} \lambda_i \left[ \sum_{m=0}^{M-1} v_i(m) \times (n-m) \right]^2.$$

That is, the quadratic filtering is a sum of the weighted squared values of the outputs of M filters needed to perform the quadratic filtering resulting from the eigenmodes of $Q_s$. If, for example, $\lambda_1$ and $\lambda_2$ are much larger than the remaining eigenvalues, the output of the quadratic filter can be effectively approximated by using O(2M) operations per sample. This is a substantial savings in processing when compared to $O(M^2/2)$ needed to implement the full quadratic operator.

As described above, upon determination of the coefficients for the filter bank 340 or portions thereof, the filter bank 340 or portions thereof (e.g., only the quadratic non-linear filter kernel) are adapted accordingly and used to filter beamformed output to provide filtered data to be processed for display. It will be recognized that the coefficients may be updated on a continuous basis as opposed to determining the coefficients for a particular imaging situation and then utilizing the coefficients determined during the entire imaging session. In addition, predetermined coefficients may be used in certain situations as opposed to determining the filter coefficients based on beamformed data representative of the region being imaged. For example, such predetermined coefficients may be advantageous when dealing with known contrast agent specific images.

All references cited herein are incorporated in their entirety as if each were incorporated separately. This invention has been described with reference to illustrative embodiments and is not meant to be construed in a limiting sense. Various modifications of the illustrative embodiments, as well as additional embodiments of the invention, will be apparent to persons skilled in the art upon reference to this description.

What is claimed is:

1. A method for use in ultrasound imaging of matter in a region, the method comprising:

providing wave energy into the region, the wave energy having a pulse spectrum centered at a fundamental frequency;

transducing wave energy returned from the region to form a set of receive signals;

beamforming the set of receive signals to provide beamformed data representative of at least a portion of the region;

separating the linear and non-linear components of the beamformed data based on a pth-order Volterra model, where p is equal to or greater than 2, wherein separating the linear and non-linear components of the beamformed data based on a pth-order Volterra model comprises applying at least one non-linear filter kernel of one or more non-linear filter kernels of a pth-order Volterra filter to the beamformed data, wherein applying the at least one non-linear filter kernel comprises defining coefficients for the at least one non-linear filter kernel using at least a two-dimensional autocorrelation; and processing at least the non-linear components of the beamformed data for use in forming an image.

2. The method of claim 1, wherein defining the coefficients for the at least one non-linear filter kernel further comprises defining the coefficients using singular value decomposition.

3. The method of claim 1, wherein separating the linear and non-linear components of the beamformed data based on a pth-order Volterra model comprises applying a second-order Volterra filter to the beamformed data, wherein the second-order Volterra filter is defined by coefficients for a linear filter kernel and a quadratic non-linear filter kernel.

4. The method of claim 1, wherein defining the coefficients for the at least one non-linear filter kernel of the pth-order Volterra filter comprises using the transduced wave energy returned from at least a portion of the region in response to a single pulse of wave energy, wherein defining the coefficients further comprises:

selecting at least a segment of the beamformed data;

forming a linear system of equations based on the pth-order Volterra model; and providing a solution to the linear system of equations.

5. The method of claim 4, wherein the solution comprises a matrix comprising elements representative of the coefficients for the at least one non-linear filter kernel, and further wherein defining the coefficients comprises performing a two-dimensional autocorrelation on the matrix.

6. The method of claim 5, wherein defining the coefficients for the at least one non-linear filter kernel further comprises using singular value decomposition to determine dominant eigenmodes for the matrix after performance of the two-dimensional autocorrelation.

7. The method of claim 6, wherein defining the coefficients for the at least one non-linear filter kernel further comprises identifying and removing one or more eigenmodes for the matrix.

8. The method of claim 4, wherein the method further comprises providing regularization of a least square solution.

9. The method of claim 8, wherein providing regularization of the least square solution comprises using single parameter and rank regularization guided by at least mean square error criterion.

10. The method of claim 8, wherein the matter in the region comprises at least normal tissue and contrast tissue and further wherein providing regularization of the least square solution comprises using single parameter and rank regularization guided by at least contrast to normal tissue ratio.

11. The method of claim 1, wherein processing at least the non-linear components of the beamformed data for use in forming an image comprises using only nonlinear components.

12. The method of claim 1, wherein processing at least the non-linear components of the beamformed data for use in forming an image comprises using at least the beamformed data filtered by the at least one non-linear filter kernel compounded with or compared to at least a portion of the linear components to display an image.

13. A system for use in ultrasound imaging of matter in a region, the system comprising:

an ultrasound transducer array comprising a plurality of transducer elements;

pulse controller circuitry coupled to the ultrasound transducer array operable in a transmit mode to provide wave energy into the region, wherein the wave energy has a pulse spectrum centered at a fundamental frequency, and further wherein the ultrasound transducer array is operable in a receiving mode to transduce wave energy returned from the region to form a set of receive signals;

a beamformer operable on the set of receive signals to provide beamformed data representative of at least a portion of the region;

filter circuitry operable on the beamformed data to separate the linear and non-linear components of the beamformed data based on a pth-order Volterra model, where p is equal to or greater than 2, wherein the filter circuitry comprises at least one non-linear filter kernel of a pth-order Volterra filter; and processing apparatus operable to use at least non-linear components of the beamformed data in formation of an image, and further wherein the processing apparatus comprises a program operable to define the coefficients for the at least one non-linear filter kernel using at least a two-dimensional autocorrelation.

14. The system of claim 13, wherein the program operable to define the coefficients is operable to define the coefficients using singular value decomposition after performance of the two-dimensional autocorrelation.

15. The system of claim 13, wherein the program operable to define the coefficients is operable to:

recognize at least a selected segment of the beamformed data;

form a linear system of equations based on the pth-order Volterra model; and provide a solution to the linear system of equations.

16. The system of claim 15, wherein the solution comprises a matrix comprising elements representative of the coefficients for the at least one non-linear filter kernel, and further wherein the program operable to define the coefficients is operable to perform a two-dimensional autocorrelation on the matrix.

17. The system of claim 16, wherein the program operable to define the coefficients is further operable to use singular value decomposition to determine dominant eigenmodes for the matrix after performance of the two-dimensional autocorrelation.

18. The system of claim 17, wherein the program operable to define the coefficients is further operable to identify and remove one or more eigenmodes for the matrix.

19. The system of claim 15, wherein the program is further operable to provide regularization of a least squares solution.

20. The system of claim 19, wherein the program is further operable to provide regularization of the least squares solution using single parameter and rank regularization guided by at least mean square error criterion.

21. The system of claim 19, wherein the program is further operable to provide regularization of the least squares solution using single parameter and rank regularization guided by at least contrast to normal tissue ratio.

22. The system of claim 13, wherein the filter circuitry comprises a second-order Volterra filter, wherein the second-order Volterra filter is defined by coefficients for a linear filter kernel and a quadratic non-linear filter kernel.

23. The system of claim 13, wherein the processing apparatus is further operable to provide for display of at least a portion of only the non-linear components of the beamformed data.

24. The system of claim 13, wherein the processing apparatus is further operable to provide for display of at least a portion the non-linear components as compounded with or compared to at least a portion of the linear components.

25. A method for use in ultrasound imaging of matter in a region, the method comprising:

providing wave energy into the region, the wave energy having a pulse spectrum centered at a fundamental frequency;

transducing wave energy returned from the region in response to a single pulse of wave energy to form a set of receive signals;

beamforming the set of receive signals to provide beamformed data representative of at least a portion of the region;

determining, with use of at least a two-dimensional autocorrelation, coefficients for at least one non-linear filter kernel of a pth-order Volterra filter bank using the beamformed data, where p is equal to or greater than 2;

applying the at least one non-linear filter kernel to the beamformed data;

processing at least the beamformed data filtered by the at least one non-linear filter kernel for use in forming an image.

26. The method of claim 25, wherein determining coefficients for the at least one non-linear filter kernel of a pth-order Volterra filter bank using the beamformed data comprises determining the coefficients using singular value decomposition after performance of the two-dimensional autocorrelation.

27. The method of claim 25, wherein applying the at least one non-linear filter kernel to the beamformed data comprises applying a quadratic non-linear filter kernel to the beamformed data.

28. The method of claim 25, wherein determining coefficients for the at least one non-linear filter kernel comprises:

processing the beamformed data to provide at least one echographic image wherein the matter in the region can be perceived by a user;

selecting at least a segment of the beamformed data from a contrast portion of the region where the matter is perceived;

selecting at least a segment of the beamformed data from a normal portion of the region where the matter is not perceived;

forming a linear system of equations based on the pth-order Volterra model; and providing a solution to the linear system of equations for use in providing the coefficients.

29. The method of claim 28, wherein the solution comprises a matrix comprising elements representative of the coefficients for the at least one non-linear filter kernel, and further wherein determining the coefficients comprises performing a two-dimensional autocorrelation on the matrix.

30. The method of claim 29, wherein determining the coefficients for the at least one non-linear filter kernel further comprises using singular value decomposition to determine dominant eigenmodes for the matrix after performance of the two-dimensional autocorrelation.

31. The method of claim 30, wherein defining the coefficients for the at least one non-linear filter kernel further comprises identifying and removing one or more eigenmodes for the matrix.

32. The method of claim 28, wherein the method further comprises providing regularization of a least squares solution.

33. The method of claim 32, wherein providing regularization of the least square solution comprises using single parameter and rank regularization guided by at least mean square error criterion.

34. The method of claim 32, wherein providing regularization of the least square solution comprises using single parameter and rank regularization guided by at least contrast to normal tissue ratio.

35. The method of claim 25, wherein processing at least the beamformed data filtered by the at least one non-linear filter kernel comprises using only the beamformed data filtered by the at least one non-linear filter kernel to display an image.

36. A method for use in ultrasound imaging of matter in a region, the method comprising:

providing wave energy into the region, the wave energy having a pulse spectrum centered at a fundamental frequency;

transducing wave energy returned from the region for use in providing data representative of at least a portion of the region;

separating the linear and non-linear components of the data representative of at least a portion of the region based on a pth-order Volterra model, where p is equal to or greater than 2; and processing at least the non-linear components of the data for use in forming an image.

37. The method of claim 36, wherein separating the linear and non-linear components of the data based on a pth-order Volterra model comprises applying a second-order Volterra filter to the data.

38. The method of claim 37, wherein the second-order Volterra filter is defined by coefficients for a linear filter kernel and a quadratic non-linear filter kernel.

39. The method of claim 36, wherein separating the linear and non-linear components of the data based on a pth-order Volterra model comprises applying a pth-order Volterra filter to the data, wherein the pth-order Volterra filter is defined by coefficients for a linear filter kernel and one or more non-linear filter kernels of the pth-order Volterra filter, and further wherein applying the pth-order Volterra filter comprises determining the coefficients for the pth-order Volterra filter using the transduced wave energy returned from at least a portion of the region in response to a single pulse of wave energy.

40. The method of claim 39, wherein determining the coefficients comprises:
selecting at least a segment of the data;
forming a linear system of equations based on the pth-order Volterra model; and
providing a solution to the linear system of equations.

41. The method of claim 40, wherein the method further comprises providing regularization of a least squares solution.

42. The method of claim 41, wherein providing regularization of the least square solution comprises using single parameter and rank regularization guided by at least mean square error criterion.

43. The method of claim 41, wherein the matter in the region comprises at least normal tissue and contrast tissue and further wherein providing regularization of the least square solution comprises using single parameter and rank regularization guided by at least contrast to normal tissue ratio.

44. The method of claim 36, wherein processing at least the non-linear components of the data for use in forming an image comprises comparing at least a portion of the non-linear components to or compounding at least a portion of the non-linear components with at least a portion of the linear components for use in characterization of the matter in the region.

45. The method of claim 36, wherein the method further comprises beamforming the data to provide beamformed data representative of at least a portion of the region, and further wherein separating the linear and non-linear components of the data based on a pth-order Volterra model further comprises:
determining at least one set of coefficients for a pth-order Volterra filter; and
applying the pth-order Volterra filter to the beamformed data, wherein determining at least one set of coefficients for the pth-order Volterra filter comprises:
providing wave energy into the region, wherein the wave energy has a pulse spectrum centered at a fundamental frequency, and further wherein the matter in the region is a lesion to be imaged;
transducing wave energy returned from the region to form a set of receive signals;
beamforming the set of receive signals to provide beamformed data representative of at least a portion of the region;
processing the beamformed data to provide at least one echographic image wherein a lesion region likely to comprise the lesion can be perceived by a user;
selecting at least a segment of the beamformed data from the lesion region;
forming a linear system of equations based on the pth-order Volterra model; and
providing a solution to the linear system of equations to provide the at least one set of coefficients for a pth-order Volterra filter.

46. The method of claim 45, wherein the pth-order Volterra filter is a second-order Volterra filter defined by coefficients for a linear filter kernel and a quadratic non-linear filter kernel of the pth-order Volterra filter.

47. The method of claim 36, wherein processing at least the non-linear components of the data for use in forming an image comprises displaying at least a portion the non-linear components of the data.

48. The method of claim 36, wherein processing at least the non-linear components of the data for use in forming an image comprises displaying at least a portion the non-linear components as compounded with or compared to at least a portion of the linear components.

49. The method of claim 36, wherein separating the linear and non-linear components of the data comprises applying at least one non-linear filter kernel of one or more non-linear filter kernels of a pth-order Volterra filter to the data, wherein applying the at least one non-linear filter kernel comprises defining coefficients for the at least one non-linear filter kernel using at least a two-dimensional autocorrelation.

50. A system for use in ultrasound imaging of matter in a region, the system comprising:
an ultrasound transducer array comprising a plurality of transducer elements;
pulse controller circuitry coupled to the ultrasound transducer array operable in a transmit mode to provide wave energy into the region, wherein the wave energy has a pulse spectrum centered at a fundamental frequency, and further wherein the ultrasound transducer array is operable in a receiving mode to transduce wave energy returned from the region for use in providing data representative of at least a portion of the region;
filter circuitry operable on the data representative of at least a portion of the region to separate the linear and non-linear components of the data based on a pth-order Volterra model, where p is equal to or greater than 2; and
processing apparatus operable to use at least non-linear components of the data in formation of an image.

51. The system of claim 50, wherein the filter circuitry comprises a second-order Volterra filter.

52. The system of claim 51, wherein the second-order Volterra filter is defined by coefficients for a linear filter kernel and a quadratic non-linear filter kernel of the second-order Volterra filter.

53. The system of claim 50, wherein filter circuitry comprises a pth-order Volterra filter, wherein the pth-order Volterra filter is defined by coefficients for a linear filter kernel and one or more non-linear filter kernels of the pth-order Volterra filter, and further wherein the processing apparatus is operable to determine the sets of coefficients using transduced wave energy returned from at least a portion of the region.

54. The system of claim 53, wherein the processing apparatus comprises a program operable to determine the coefficients, and further wherein the program is operable to:
recognize at least a selected segment of the data;
form a linear system of equations based on the pth-order Volterra model; and
provide a solution to the linear system of equations.

55. The system of claim 54, wherein the program is further operable to provide regularization of a least squares solution.

56. The system of claim 55, wherein the program is further operable to provide regularization of the least squares solution using single parameter and rank regularization guided by at least mean square error criterion.

57. The system of claim 55, wherein the program is further operable to provide regularization of the least squares solution using single parameter and rank regularization guided by at least contrast to normal tissue ratio.

58. The system of claim 50, wherein the processing apparatus is further operable to compare at least a portion of the non-linear components to at least a portion of the linear components for use in characterization of the matter in the region.

59. The system of claim 50, wherein the processing apparatus is further operable to provide for display of at least a portion the non-linear components of the data.

60. The system of claim 50, wherein the processing apparatus is further operable to provide for display of at least a portion the non-linear components as compounded with or compared to at least a portion of the linear components.

61. The system of claim 50, wherein the processing apparatus further comprises a program operable to define the coefficients for the at least one non-linear filter kernel using at least a two-dimensional autocorrelation.

62. A method for use in ultrasound imaging of matter in a region, the method comprising:

providing wave energy into the region, the wave energy having a pulse spectrum centered at a fundamental frequency;

transducing wave energy returned from the region in response to a single pulse of wave energy for use in providing data representative of at least a portion of the region;

determining coefficients for a linear filter kernel and one or more non-linear filter kernels of a pth-order Volterra filter bank using the data, where p is equal to or greater than 2;

applying the linear filter kernel and one or more non-linear filter kernels to the data; and processing at least the data filtered by one or more of the non-linear filter kernels for use in forming an image.

63. The method of claim 62, wherein applying the linear filter kernel and one or more non-linear filter kernels to the data comprises applying the linear filter kernel and a quadratic non-linear filter kernel to the data based on a second-order Volterra model.

64. The method of claim 62, wherein determining coefficients for a linear filter kernel and one or more non-linear filter kernels comprises:

processing the data to provide at least one echographic image wherein the matter in the region can be perceived by a user;

selecting at least a segment of the data from a contrast portion of the region where the matter is perceived;

selecting at least a segment of the data from a normal portion of the region where the matter is not perceived;

forming a linear system of equations based on the pth-order Volterra model; and providing a solution to the linear system of equations to provide the at least one set of coefficients for a pth-order Volterra filter.

65. The method of claim 64, wherein the method further comprises providing regularization of a least squares solution.

66. The method of claim 62, wherein processing at least the data filtered by one or more of the non-linear filter kernels comprises using at least the data filtered by one or more of the non-linear filter kernels to display an image.

67. The method of claim 62, wherein processing at least the data filtered by one or more of the non-linear filter kernels comprises using at least the data filtered by one or more of the non-linear filter kernels compounded with or compared to at least a portion of the linear components to display an image.

* * * * *